United States Patent

Johnen et al.

[11] Patent Number: 6,079,715
[45] Date of Patent: Jun. 27, 2000

[54] ROTARY SHAFT SEAL HAVING A PTFE SEAL LIP AND A METHOD AND APPARATUS OF MANUFACTURING SAME

[75] Inventors: Rolf Johnen, Hoisdorf/Hamburg; Siegfried Dunse, Kasseburg, both of Germany

[73] Assignee: Dichtungstechnik G. Bruss GmbH & Co. KG, Hamburg, Germany

[21] Appl. No.: 08/966,039

[22] Filed: Nov. 7, 1997

[30] Foreign Application Priority Data

Oct. 15, 1996 [DE] Germany .................. 196 42 544.1

[51] Int. Cl.[7] ........................................ F16J 15/32
[52] U.S. Cl. .................. 277/565; 277/551; 277/562; 277/570
[58] Field of Search .................. 277/551, 562, 277/565, 570, 573, 575

[56] References Cited

U.S. PATENT DOCUMENTS

| | | | |
|---|---|---|---|
| 4,243,235 | 1/1981 | Repella | 277/152 |
| 4,344,633 | 8/1982 | Niksa | 277/228 |
| 4,526,383 | 7/1985 | Fuchs et al. | 277/152 |
| 4,669,736 | 6/1987 | Meijer | 277/27 |
| 4,739,998 | 4/1988 | Steusloff et al. | 277/134 |
| 4,818,620 | 4/1989 | Pilkington | 277/152 |
| 4,898,395 | 2/1990 | Kawase | 277/207 |
| 4,936,591 | 6/1990 | Romero | 277/153 |
| 5,186,472 | 2/1993 | Romero et al. | 277/37 |
| 5,209,499 | 5/1993 | Ruff, Jr. et al. | 277/50 |
| 5,209,502 | 5/1993 | Savoia | 277/152 |
| 5,215,337 | 6/1993 | Spirkowyc et al. | 285/133 |
| 5,513,859 | 5/1996 | Huber et al. | 277/207 |
| 5,615,894 | 4/1997 | Vom Schemm | 277/134 |

Primary Examiner—Anthony Knight
Assistant Examiner—Vishal Patel
Attorney, Agent, or Firm—Rogers & Killeen

[57] ABSTRACT

A rotary shaft seal having an elastomer seat for fitting into the bore of a hub or for the attachment onto a shaft comprises a seal washer, connected to a metal enforcement ring through a elastomer intermediate layer. The elastomer intermediate layer consists of a material having a chemical endurance comparable to that of PTFE, in particular of fluorocaoutchouc, and has a thickness of less than 0.5 mm, preferably in the range of 0.05 mm to 0.5 mm. This intermediate layer connects the seal washer with the enforcement ring according to a method according to the invention by simultaneously vulcanization with the elastomer seat on the outer side of the enforcement ring, wherein the injection pressure acting during injection and vulcanization is kept away from the intermediate layer.

13 Claims, 2 Drawing Sheets

ROTARY SHAFT SEAL HAVING A PTFE SEAL LIP AND A METHOD AND APPARATUS OF MANUFACTURING SAME

The present invention refers to a rotary shaft seal having a rubber seat and a PTFE seal lip (PTFE=polytetrafluor ethylene), attached to a metal enforcement ring through an elastomer intermediate layer, as well as to a method and an apparatus of manufacturing a rotary shaft seal of that kind.

A rotary shaft seal of this kind is known from DE 33 09 538 C2. Therein, the elastomer intermediate layer has a thickness of at least 0.5 mm and a radial extension of 3 to 7 times this thickness.

A preferred thickness range is between 0.9 and 1.4 mm. The intermediate layer can either be adhered to the PTFE seal lip or may be formed in the course of a direct molding process or may be molded to a reinforcement ring by means of vulcanization. Further statements about the manufacture of such rotary shaft seal are not made. Conventional synthetic rubber, as it is used in accordance with the operating conditions of a static sealing at the outer diameter of a rotary shaft seal and which is commonly used for reasons of an economic production, has a different chemical endurance compared to PTFE, which during operation may lead to problems, e.g. of bonding strength and therefore tightness.

A method of manufacturing a similar shaft seal is known from EP 0 213 988 B1. A nose at the tool is used for limiting the flow of rubber from the mold cavity of the tool, said nose pressing into the PTFE sealing washer during the manufacturing process and weakening said washer so that the bend line of the PTFE sealing washer is folded. The upper portion of the mold directly impresses into the metal of the enforcement ring to prevent a flow of rubber from the cavity of the tool also at this location during the injection of rubber for forming an intermediate layer. The pressure nose provided for this purpose causes a radial distance between the outer diameter of the PTFE washer and the inner diameter of the enforcement ring, which leads to a large structure, in particular in the radial direction.

Finally, a rotary shaft seal having a PTFE seal lip is known from U.S. Pat. No. 5,198,053, in which the PTFE seal lip is attached directly through an intermediate layer made of a thermoplastic FEP (flourized ethylenpropylen). The thickness of this intermediate layer shall in practical application be between 0.254 mm and 0.127 mm. By heating to at least 377° C., the surface of the PTFE melts and is adhered to the metal enforcement ring through the molten intermediate layer made of FEP. At such a high temperature, a rubber-metal bond is thereby destroyed so that radial shaft seals having an elastomer seat, i.e. a completely or partially rubberized outer diameter, cannot be manufactured in an economic manner.

The object of the invention is to provide a rotary shaft seal having an elastomer seat, and a method and an apparatus of manufacturing same, wherein a manufacture in particularly small dimensions, in particular in the axial direction with a high quality of the attachment of the seat lip to the metal enforcement ring shall be enabled at low cost.

A rotary shaft seal according to the invention fulfilling these demands its is disclosed.

A method and an apparatus of manufacturing such a rotary shaft seal is disclosed.

Advantageous embodiments of the rotary shaft seal and of the method and apparatus are disclosed.

A rotary shaft seal according to the invention reveals the following advantages:

1. The rotary shaft seal with the PTFE seal lip has a simple, inexpensive design and is suitable for the smallest assembly spaces, as exist in particular in motor vehicles.
2. The PTFE seal lip is not weakened by pressure noses of the form tool, so that a bend line with a fold at a weak position of the PTFE seal lip is avoided.
3. The designer may design freely at the outer diameter of the rotary shaft seal.
4. It is possible to establish a complete or partial elastomer seat at the outer diameter of an inexpensive elastomer with a Shore hardness in the range between 50 and 90, in particular of an ACM or AEM rubber or of an NBR, HNBR or MVQ rubber.
5. It is possible to provide an additional protective lip of a PTFE compound, which is equal or different to that of the seal lip.
6. The PTFE seal lip is attached at the metal enforcement ring through a thin elastomer intermediate layer which is partially separated from the elastomer seat provided at the enforcement ring in a manner that the two different elastomers cannot blend during the heating needed for vulcanization.
7. The intermediate layer consists of an elastomer having an endurance comparable to PTFE. The elastomer of the intermediate layer is preferably a fluorocaoutchouc (FPM) that is known per se.
8. The elastomer intermediate layer has a small defined thickness of less than 0.5 mm, preferably between 0.05 and 0.15 mm. The ratio of this thickness of the intermediate layer to the radial width can be brought without any problems to values of more than 20 and still enable the manufacture of rotary shaft seals for very small assembly spaces, which are clearly smaller than the assembly spaces standardized in accordance with DIN 3760/ISO6194.
9. The connection of the PTFE seal washer with the enforcement ring through the intermediate layer and the application of the elastomer seat at the outer diameter of the enforcement ring and/or the attachment of static seal elements can be performed in one working step.

The invention will now be explained by means of schematic drawings of embodiments including further details.

Figure 1:
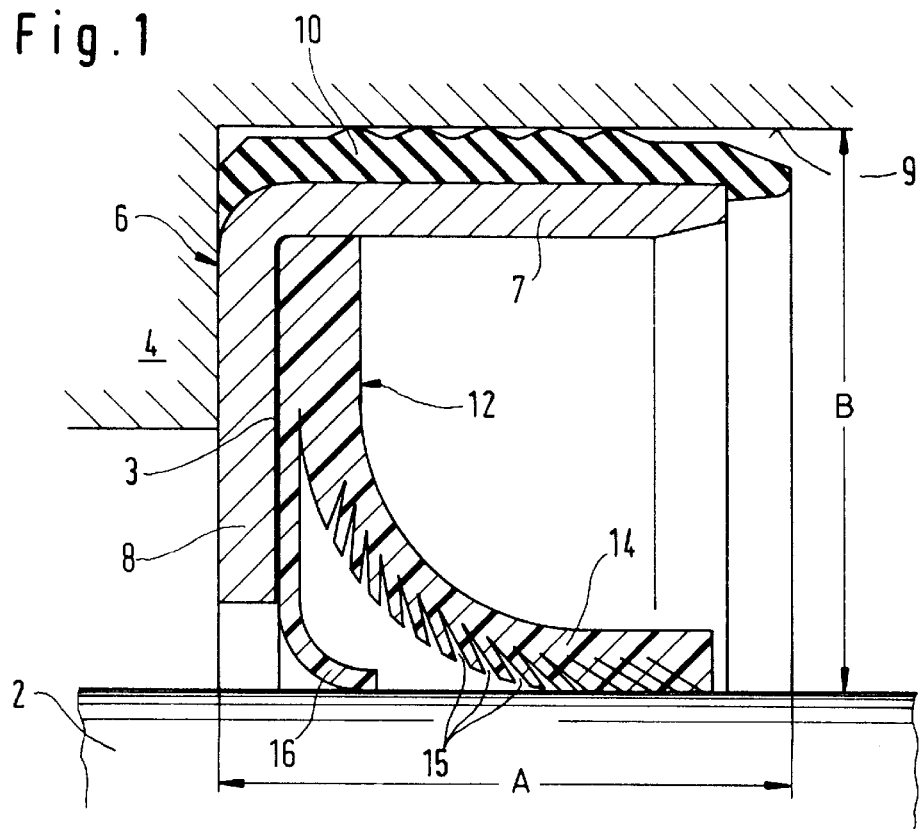
FIGS. 1 and 2 show profile sections through rotary shaft seals according to the invention in two different embodiments.

The profile section through a first embodiment of a rotary shaft seal according to the invention shows this rotary shaft seal in an assembly space defined by measures A and B between a shaft indicated by 2 and a hub indicated by 4. In a realized rotary shaft seal, B=7.9 mm and A=7 mm. A further reduction to B-values of 4.5 mm and A-values of 5 mm seems to be possible without any problems.

A metal enforcement ring 6 having an axial flange 7 and a radial flange 8 belongs to the rotary shaft seal. A rubber or elastomer seat 10 to be fit into the bore 9 of the hub 4 is vulcanized onto the axial flange 7. The elastomer seat 10 projects over the length of the axial flange 7. The elastomer material of the elastomer seat 10 is preferably ACM or AEM rubber. As an alternative, NBR, HNBR or MVQ-based rubber may also be used. Rubbers of that kind have favorable static sealing properties and enable an economic manufacture.

A seal washer 12 integrally formed with a seal lip 14 and a protective lip 16 is attached at the inner side of the radial flange 8 through an intermediate layer 3 of fluorocaoutchouc of a defined thickness of less than 0.5 mm. The seal lip 14 and the protective lip 16 formed by radially dividing the seal washer are bent in the same direction in this embodiment. The transverse notches 15 on the side of the seal lip facing the shaft 2 create a return twist required for the sealing function.

The shape and manufacture of such a seal washer with a seal lip and protective lip are known and therefore not described in more detail. However, it is also possible to manufacture a one-piece seal washer with a seal lip and protective lip of two different PTFE compounds so that the material of the seal lip can be adapted to the conditions of the running operation during oil lubrication, and the material of the protective lip can be adapted to the conditions of dry running.

Figure 2:
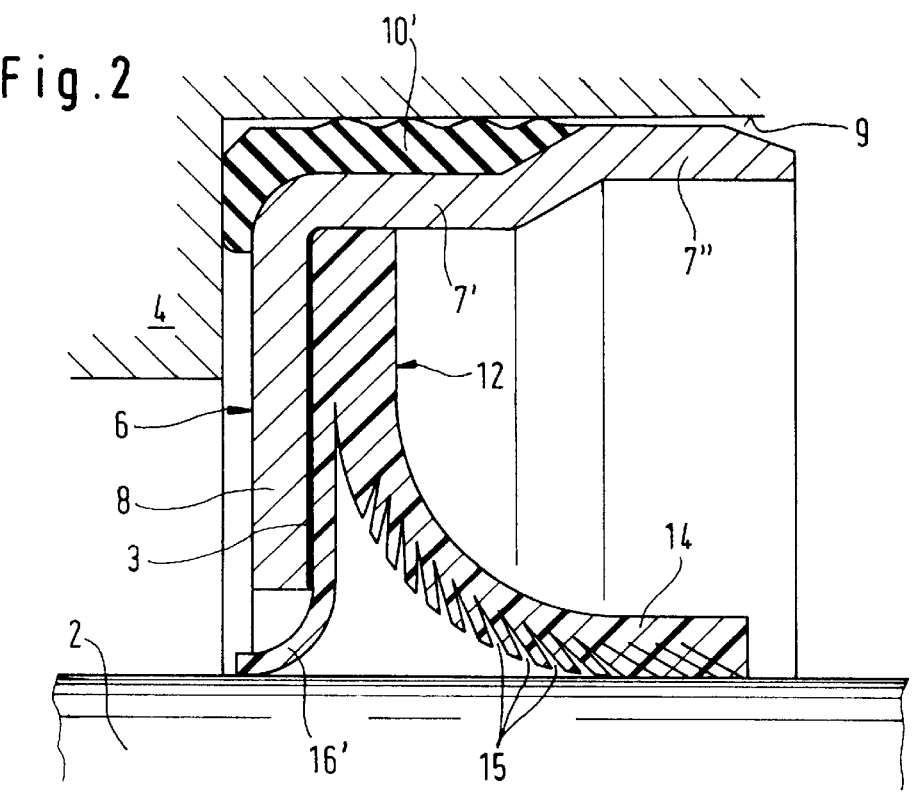

The rotary shaft seal according to FIG. 2 differs from the seal according to FIG. 1 in two manners:

The axial flange 7 of the metal enforcement ring 6 is crimped, wherein two partial sections 7' and 7" are formed. An elastomer seat 10' to be fit into the bore 9 of the hub 4 is formed only at the partial section 7' that is radially more inwardly.

A further difference is that the protective lip 16' is bent in a direction opposite to the seal lip 14 in assembled condition.

Moreover, the structure is the same as the structure of the rotary shaft seal according to FIG. 1 and it is not described any further.

Figure 3:
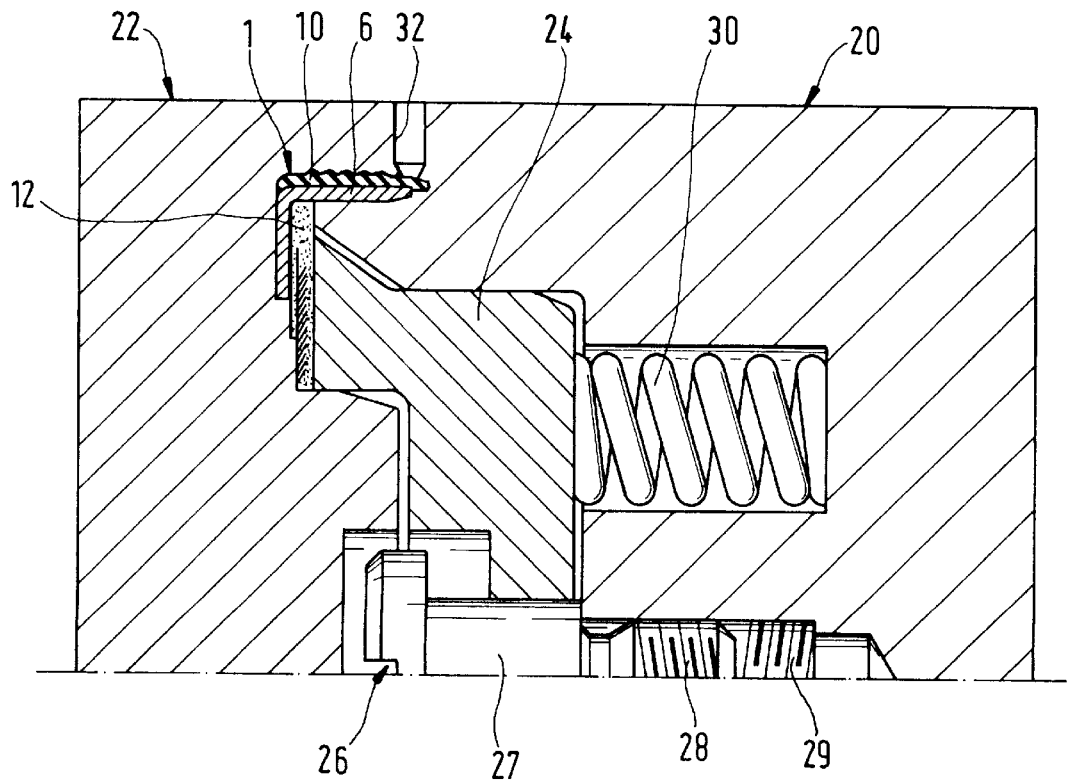
FIG. 3 is a mold for manufacturing a rotary shaft seal according to the invention in closed condition after terminating the injection process of rubber for a rubber seat.

FIG. 3 shows a form tool for manufacturing a rotary shaft seal according to FIGS. 1 and 2.

The mold shown has an upper mold half 20 and a lower mold half 22. A mold core 24 is displaceably guided in the upper mold half 20. A screw 26 having a fit collar 27 serves as a guide, said screw being screwed with a threaded section 28 into a thread blind hole 29 in the upper mold half 20. The mold core 24 is pressed by one or a plurality of springs 30 in the direction parallel to the axis 29 of the screw 26 against a cavity in the lower mold half 22 and thereby pressed onto the assembly of seal washer 12 and metal enforcement ring 6 inserted into the cavity.

An injection bore for injecting rubber for forming the rubber seat 10 is designated by reference numeral 32. The mold is shown in FIG. 3 in closed condition after the injection process through the injection bore 32, and the finished part according to FIG. 4 may then be removed from the mold after cooling. During assembly into the assembly space, the seal lip 14 and the protective lip 16 are bent either according to FIG. 1 or according to FIG. 2, wherein the bending of the protective lip 16 according to FIG. 1 is designated as being "overlapping".

In the form tool described, a constant force prevails due to the spring load to the core 24 by one or a plurality of springs 30 and thus a contact surface pressing onto the assembly of seal washer 12 and enforcement ring 6. Because of the pressing of the radial surface of the upper mold half 20 to the seal washer 12 and the respective pressing of the enforcement ring to the radial surface of the lower mold half 22, it is avoided that elastomer material for the elastomer seat injected through the injection bore 32 may reach the region of the seal washer or the outer radial surface of the radial flange 8 of the enforcement ring 6. The high inner pressure of the mold caused by injecting the rubber is completely kept away from these locations so that a comparably low force defined by the spring force of the spring 30 is effective in the axial direction. Harmful deformations of the PTFE seal washer 12 during the manufacturing process are avoided thereby. It is also avoided that the strength of the intermediate layer 3 is varied in an uncontrolled manner. Thus, the desired low strength of the intermediate layer may be kept in a defined manner, in particular in the scale of less than 0.3 mm, preferably between 0.05 mm and 0.15 mm. By this, the intermediate layer vulcanizes within the shortest time in the heated lower mold half 22. A further consequence of this construction of the form tool is that practically no excess material is forced out of the intermediate layer 3 of the cavity for the elastomer seat 10.

Instead of being formed of one single tube, the tubular blank of PTFE (polytetrafluor ethylene) for manufacturing a seal washer 12 may be formed of different tubes put into one another and made of differently formulated PTFE compounds, which may be fixedly connected to one another by sintering. Thereby an optimization of the tightness and of the wear behavior may be achieved, since the part of the seal lip contacting the shaft 2 may be made of a PTFE compound formulated especially for the running conditions during oil lubrication and the protective lip 16 may be made of a PTFE compound especially suitable for the conditions of dry running.

The sequence of method steps when manufacturing a rotary shaft seal 1 is now described under reference to FIG. 3:

(1) A seal washer 12 is manufactured of one or two different PTFE compounds in an already known manner.

(2) The seal washer 12 is etched on the side preferably provided with a protective lip 16.

(3) A bonding agent is applied onto the etched side.

(4) A prepared fluorocaoutchouc solution applied in a dosed manner onto the etched side provided with the bonding agent by the application being made by a serigraphy process or as a "caterpillar" wherein in the latter case the fluorocaoutchouc solution is prepared with an increased velocity.

(5) The seal washer 12 is abutted against the inner side of the radial flange 8 of the enforcement ring 6, and the arrangement formed in this manner is inserted into the cavity or the heated lower form half 22 of the form tool.

(6) The form tool is closed.

(7) Rubber for forming rubber seat 10 is injected into the closed mold.

(8) The fluorocaoutchouc solution is vulcanized for forming an adhering intermediate layer 3 between the seal washer 12 and the radial flange 8 of the enforcement ring at the time of the vulcanization process of the rubber injected for forming the elastomer seat 10, wherein the vulcanization period is determined due to the low thickness of the intermediate layer 3 by the time period required for vulcanizing the elastomer seat 10.

Figure 4:
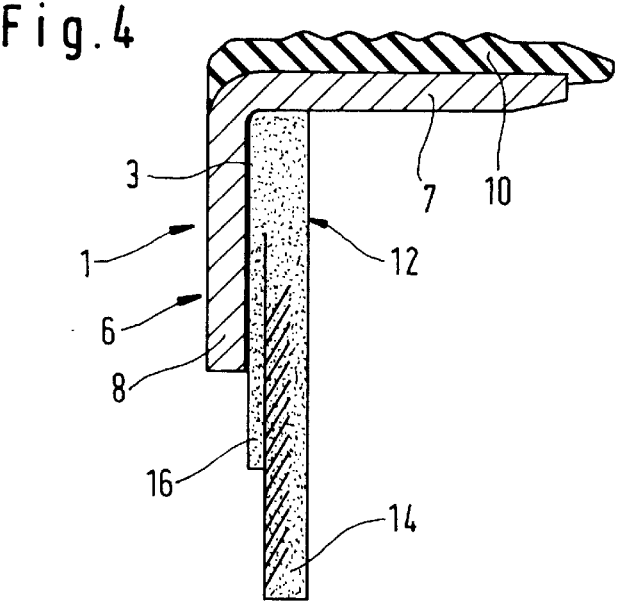
FIG. 4 is a rotary shaft seal according to the invention in the condition in which it is removed from the mold according to FIG. 3.

(9) The tool is opened and the rotary shaft seal according to FIG. 4 is removed.

The features of the invention disclosed above in the description, in the drawings and in the claims may be essential for the invention in their different embodiments either individually or in any combination.

We claim:

1. A rotary shaft seal having an elastomer seat and a PTFE seal lip attached to a metal enforcement ring through an elastomer intermediate layer, wherein the elastomer intermediate layer has a thickness of less than 0.5 mm and greater than 0.1 mm, and wherein the elastomer seat and the intermediate layer are designed and distant from one another such that the different elastomers cannot blend during manufacture.

2. The rotary shaft seal according to claim 1, characterized in that the elastomer seat (10, 10') is arranged substantially radially outside an axial flange (7, 7') of the enforcement ring (6).

3. The rotary shaft seal according to claim 1, characterized in that the intermediate layer consists of a fluorocaoutchouc.

4. The rotary shaft seal according to claim 1, characterized in that the thickness of the intermediate layer is less than 0.3 mm.

5. The rotary shaft seal according to claim 1, characterized in that it comprises a PTFE protective lip (16, 16').

6. The rotary shaft seal according to claim 5, characterized in that the protective lip (16, 16') is formed integrally with the sealing lip (14, 14') on a seal washer (12) made of a PTFE compound.

7. The rotary shaft seal according to claim 6, characterized in that the intermediate layer (3) is provided between the protective lip (16, 16') and the enforcement ring (6).

8. The rotary shaft seal according to claim 1, characterized in that the elastomer of the elastomer seat has a Shore hardness of 50 to 90.

9. The rotary shaft seal according to claim 8, characterized in that the elastomer of the elastomer seat has a Shore hardness of 65 to 70.

10. The rotary shaft seal according to claim 8, characterized in that the elastomer of the elastomer seat is an ACM or AEM rubber.

11. The rotary shaft seal according to claim 8, characterized in that the elastomer of the elastomer seat is a NBR, HNBR or MVQ-based rubber.

12. The rotary shaft seal of claim 3, wherein the intermediate layer comprises FPM-caoutchouc.

13. The rotary shaft seal of claim 4, wherein the thickness of the intermediate layer is less than 0.15 mm.

* * * * *